Patented Nov. 7, 1950

2,528,761

UNITED STATES PATENT OFFICE 2,528,761

AZEOTROPIC DISTILLATION OF ETHYL ALCOHOL FROM METHYL ETHYL KETONE

George R. Lake and Josephine M. Stribley, Long Beach, Calif., assignors to Union Oil Company of California, Los Angeles, Calif., a corporation of California No Drawing. Application November 6, 1944, Serial No. 562,268

1 Claim. (Cl. 202—42)

This invention relates to a process of azeotropic distillation to prepare pure alcohols from complex organic fractions which are difficult to separate by means of ordinary fractional distillation due to small differences in boiling points existing between the components contained in the fraction. More particularly the invention relates to a process of azeotropic distillation for separating alcohols and ketones which are difficult to separate by means of ordinary fractional distillation due to small differences existing in the boiling points of the alcohols and ketones.

Pyroligneous acid as ordinarily obtained from the destructive distillation of wood comprises a complex mixture of organic acids, alcohols, esters and ketones each of which would be valuable if it could be obtained in comparatively pure form. Certain of the products such as acetic acid and methanol may be obtained from the mixture by ordinary fractional distillation. However, the majority of the alcohols and ketones present therein form a series of positive azeotropes with one another so that complete recovery of the individual compounds is not possible.

Examples of closely boiling alcohols and ketones which may or may not form azeotropic mixtures are: ethanol, boiling point 78.5° C., and methyl ethyl ketone, boiling point 79.6° C.; cyclohexanol, boiling point 161.5° C., and cyclohexanone, boiling point 156.7° C.; allyl alcohol, boiling point 96° C. to 97° C.; methyl n-propyl ketone, boiling point 101.7° C., and methyl isopropyl ketone, boiling point 95° C.; n-butyl alcohol, boiling point 117.7° C., and methyl secondary butyl ketone, boiling point 118° C.; and methyl isobutyl ketone, boiling point 119° C., glycol, boiling point 197° C. and heptyl methyl ketone, boiling point 194° C. to 196° C. Although this is by no means a complete list of the difficultly separable alcohols and ketones, it serves to illustrate the types of mixtures which may be separated by means of our invention including the saturated, unsaturated, monohydric, polyhydric or cyclic alcohols with ketones of similar boiling points. Certain of these closely boiling alcohols and ketones are more difficult to separate by ordinary fractional distillation than would be expected because of the formation of positive azeotropes with each other.

The process of separating one organic compound from another organic compound of substantially the same boiling point contained in a mixture of such compounds by azeotropic distillation is well known and widely practiced, for example, in the petroleum industry. This process consists in distilling the mixture in the presence of an extraneous substance which has a preferential affinity for one of the components contained in the mixture, thus causing a disturbance of the vapor pressure equilibrium that formerly existed in the fraction in such a manner that the vapor pressure or fugacity of at least one component of the fraction is changed sufficiently to permit its separation by controlled fractional distillation.

It is an object of our invention to further the progress in the art of the separation of alcohols and ketones by the process of azeotropic distillation which is simpler and more efficient than the ordinary chemical separation methods.

It is a further object of our invention to separate alcohols and ketones which are impossible to separate by means of ordinary fractional distillation due to small differences existing in their boiling points and due further to azeotropes formed between the alcohols and ketones. A more specific object of our invention is to perform the separation of alcohols and ketones of small boiling point differences by means of azeotropic distillation.

Other objects and advantages of our invention will occur to those skilled in the art as the description thereof proceeds.

According to our invention the separation of alcohols from ketones is accomplished by azeotropic distillation wherein the azeotrope former consists of an aromatic hydrocarbon or an alkyl derivative of an aromatic hydrocarbon whereby an azeotrope is formed with the alcohol present in the mixture permitting its recovery as an azeotropic overhead.

In employing our process for the preparation of pure alcohols or ketones, we may use a complex fraction such as for example the product from the destructive distillation of wood containing mixtures of alcohols and ketones wherein we employ an azeotrope former as disclosed herein which azeotrope former we have found will form minimum boiling azeotropes with the alcohols, and in certain cases with the ketones. These azeotropes, however, are found to differ sufficiently in boiling point to permit the recovery of said alcohol in the azeotropic distillate leaving ketones as distillation residue. We prefer to employ our process on narrow boiling fractions containing closely boiling alcohols and ketones wherein said alcohol is obtained in relatively pure form as the overhead distillate and the ketone is obtained in relatively pure form in a distillation residue. However, our process is equally applicable to broad fractions containing more than one alcohol and ketone, wherein the process may consist of several stages in which successive azeotropic distillates of the various alcohols are obtained with recovery of the various ketones as intermediate products. For example in employing our process on a fraction boiling between about 60° C. and about 150° C. in which fraction there may be contained alcohol-ketone combinations of similar boiling points such as methanol and methyl ethyl ketone, ethanol and methyl ethyl ketone, allyl alcohol and methyl isopropyl ketone, and allyl alcohol and methyl n-propyl ketone, and the like, which alcohols and ketones may or may not form azeotropes with each other we may accomplish the separation by successive stages employing any one or combination of the azeotrope formers herein described, the first stage of which consisting of an azeotropic distillation in the presence of an aromatic azeotrope former as for example, benzene selected to form an azeotrope with methanol which azeotropic mixture is taken overhead in a primary distillation, subjecting the residue from this initial azeotropic distillation to a successive azeotropic distillation in the presence of further amounts of an aromatic hydrocarbon to form an azeotropic mixture with the ethanol in said fraction permitting its recovery as an azeotropic distillate. The bottoms from this secondary azeotropic distillation may then be subject to an ordinary fractional distillation to remove therefrom methyl ethyl ketone and subsequently to a tertiary azeotropic distillation in the presence of an aromatic hydrocarbon, as for example, toluene as an azeotrope former selected to form an azeotrope with a n-propyl alcohol and the allyl alcohol permitting their recovery as an overhead distillate leaving as distillation bottoms in the tertiary azeotropic distillation methyl n-propyl ketone and methyl isopropyl ketone. Many modifications of this process may be envisioned and employed without departing from the principle of our invention, which invention comprises primarily the separation of alcohols and ketones either from comparatively pure binary mixtures or from complex fractions by azeotropically distilling said mixtures in the presence of an aromatic hydrocarbon as an azeotrope former. Any desired process may be employed for breaking the alcohol-aromatic azeotropes formed in the azeotropic distillations such as for example water washing, solvent extraction, secondary azeotropic distillation, extractive distillation, selective adsorption, and the like. We have successfully employed water washing wherein an alcohol-water mixture is obtained which may be distilled to give water and a water-alcohol azeotrope the purity of which is dependent only on the per cent water in the azeotrope formed.

The type of operation employed in utilizing the process of our invention will depend largely upon the conditions encountered and the quality of the desired end products. We may, for example, employ azeotrope formers as hereinbefore disclosed with comparatively wide boiling fractions containing mixtures of alcohols and ketones which alcohols may be saturated, unsaturated, cyclic, monohydric or polyhydric, in which case one or more azeotrope former may be employed depending on the boiling range of said fraction. More preferably, however, we may employ our process for separating any of the above types of alcohols from ketones in a comparatively pure binary mixture.

We have found that the aromatic hydrocarbons are excellent azeotrope formers for separating alcohols and ketones providing they boil not more than 30° C. below and not more than 20° C. above the average boiling point of the particular alcohol and ketone which we wish to separate. We are, therefore, able to employ benzene, boiling point 80.09° C., as an azeotrope former to separate methyl alcohol, boiling point 64.5° C., and methyl ethyl ketone boiling point 79.6° C.; ethyl alcohol, boiling point 78.5° C., and methyl ethyl ketone; tertiary butyl alcohol, boiling point 82.8° C. and methyl ethyl ketone; propyl alcohol, boiling point 97.8° C., and methyl isopropyl ketone, boiling point 95.0° C. In like manner we may employ toluene, boiling point 110.65° C., to separate propyl alcohol and methyl isopropyl ketone, secondary butyl alcohol and methyl n-propyl ketone, isobutyl alcohol and methyl isopropyl ketone, n-butyl alcohol, methyl isobutyl ketone, and the like. Further we may employ ortho-, meta-, or para-xylene or mixtures of these for the separation of the higher boiling alcohols and ketones such as amyl alcohol and dipropyl ketone, hexyl alcohol and methyl n-amyl ketone and cyclohexanol and cyclohexanone, and the like. Still other aromatics such as ethyl benzene, isopropyl benzene, trimethyl benzene, and the like may be employed as azeotrope formers for the higher boiling alcohols and ketones. The use of these aromatics as azeotrope formers is not limited to the examples cited above which are given only to illustrate the broad application of our process inasmuch as we may employ anyone of two or more aromatics to separate those alcohol ketone mixtures which have boiling points commensurate, in respect to the above temperature limitations, to more than one aromatic. It may be observed by examination of the boiling points of the various aromatic hydrocarbons and of the necessary temperature limitations established for azeotropy according to this invention that a separation of the alcohols of monohydric, polyhydric, saturated, unsaturated and cyclic types, and the ketones boiling from 60° C. and higher may be accomplished by the use of the proper aromatic hydrocarbon boiling not more than 30° C. below or 20° C. above the particular alcohol and ketone that we may desire to separate.

The following example may serve to illustrate the simplicity and effectiveness of the separation of alcohols and ketones by means of azeotropic distillation employing the aromatic hydrocarbons as azeotrope formers.

*Example 1*

A mixture of 118 volumes of ethyl alcohol, boiling point, 173.3° F. and 129 volumes of methyl ethyl ketone, boiling point 175.3° F., was prepared as feed for an azeotropic distillation. 247 volumes of this synthetic mixture was combined with 387 volumes of benzene and subjected to a controlled fractional distillation in a rectifying column of approximately 25 theoretical plates at an internal reflux ratio of 20 to 1. The initial overhead product from the azeotropic distillation representing 39.4% of the charge was obtained at a vapor temperature of 154° F., and consisted of 43.7% ethyl alcohol and 53.6% of benzene. A transition fraction amounting to 7.9% of the charge was then taken overhead at vapor temperatures in the range of 154° F. to 173° F. and consisted of 24% methyl ethyl ketone, 17.3% ethyl-alcohol and 58.7% of benzene. A third overhead fraction was obtained at a boiling point of 173° F. to 175° F. representing an azeotrope of methyl ethyl ketone and benzene, and which together with the bottoms amounted to 52.7% of the charge and consisted of 35% methyl ethyl ketone and 65% benzene.

We claim:

A process for separating ethyl alcohol from methyl ethyl ketone contained in a mixture with said ethyl alcohol and which is difficult to separate by means of ordinary fractional distillation due to a small difference in their boiling points and due further to an azeotrope formed between methyl ethyl ketone and the ethyl alcohol which comprises azeotropically distilling the ethyl alcohol-ketone mixture in the presence of benzene which has the effect of forming a minimum boiling azeotrope with the ethyl alcohol whereby it may be separated from the methyl ethyl ketone as an azeotropic overhead leaving said methyl ethyl ketone in the distillation residue.

GEORGE R. LAKE.
JOSEPHINE M. STRIBLEY.

REFERENCES CITED

The following references are of record in the file of this patent:

UNITED STATES PATENTS

| Number | Name | Date |
| --- | --- | --- |
| 1,079,004 | Golodeyz | Nov. 18, 1913 |
| 1,702,495 | Clapp | Feb. 19, 1929 |
| 1,847,597 | Charles | Mar. 1, 1932 |
| 2,053,769 | Drefus | Sept. 8, 1936 |
| 2,192,489 | Rosebaugh | Mar. 5, 1940 |
| 2,198,651 | Bludworth | Apr. 30, 1940 |
| 2,324,255 | Britton | July 13, 1943 |

FOREIGN PATENTS

| Number | Country | Date |
| --- | --- | --- |
| 286,425 | Germany | Aug. 10, 1915 |

OTHER REFERENCES

Industrial and Eng. Chemistry (Analytical ed.), Vol. 2, No. 1, January 15, 1930, pages 109, 110, 112, 113.

Industrial and Eng. Chemistry, August 1941, pages 1019 to 1021.

Methyl Ethyl Ketone Shell Chemical Co. (c) 1938, pages 32, 31.